(12) United States Patent
Nadeem et al.

(10) Patent No.: US 8,576,069 B2
(45) Date of Patent: Nov. 5, 2013

(54) MOBILE SENSING FOR ROAD SAFETY, TRAFFIC MANAGEMENT, AND ROAD MAINTENANCE

(75) Inventors: Tamer M. Nadeem, Plainsboro, NJ (US); Michael T. Loiacono, Hillsborough, NJ (US)

(73) Assignee: Siemens Corporation, Iselin, NJ (US)

( * ) Notice: Subject to any disclaimer, the term of this patent is extended or adjusted under 35 U.S.C. 154(b) by 311 days.

(21) Appl. No.: 12/901,645

(22) Filed: Oct. 11, 2010

(65) Prior Publication Data

US 2011/0095908 A1 Apr. 28, 2011

Related U.S. Application Data

(60) Provisional application No. 61/253,870, filed on Oct. 22, 2009.

(51) Int. Cl.
*G08G 1/017* (2006.01)

(52) U.S. Cl.
USPC . 340/539.25; 340/905; 340/937; 340/995.13; 348/149

(58) Field of Classification Search
USPC ............. 340/937, 539.25, 905, 995.13, 933; 348/148, 149; 382/105; 701/119
See application file for complete search history.

(56) References Cited

U.S. PATENT DOCUMENTS

| | | | |
|---|---|---|---|
| 5,638,116 A | 6/1997 | Shimoura | |
| 6,489,920 B1 | 12/2002 | Anders | |
| 6,553,131 B1 | 4/2003 | Neubauer | |
| 6,831,556 B1 * | 12/2004 | Boykin | 340/539.1 |
| 6,859,546 B2 | 2/2005 | Matsukawa | |
| 6,999,004 B2 | 2/2006 | Comaniciu | |
| 7,593,809 B2 * | 9/2009 | Rosen et al. | 701/119 |
| 7,764,808 B2 | 7/2010 | Zhu | |
| 7,872,593 B1 * | 1/2011 | Rauscher et al. | 340/933 |
| 2003/0128275 A1 * | 7/2003 | Maguire | 348/149 |
| 2008/0294401 A1 | 11/2008 | Tsin | |
| 2009/0208060 A1 | 8/2009 | Wang | |
| 2010/0293580 A1 * | 11/2010 | Latchman | 725/71 |

OTHER PUBLICATIONS

Lu et al. Traffic Light Recognition, Journal of the Chinese Institute of Engineers, vol. 31, No. 6, pp. 1069-1075, Dec. 2008.

(Continued)

*Primary Examiner* — Brent Swarthout
(74) *Attorney, Agent, or Firm* — Donald B. Paschburg

(57) ABSTRACT

Mobile monitoring systems and methods are disclosed. In accordance with one aspect of the invention, the system includes a plurality of vehicles and a base communication station that are in communication with each other. Each of the vehicles includes a camera that generates image data, a location device that generates geographic coordinates of the vehicle, a computing device that receives the image data from the camera and the geographic coordinates of the vehicle and forms a processed image signal that includes the image data, the geographic coordinates and a time stamp, and a communication device that receives the processed image signal from the computing device and wireless transmits the processed image signal to the base communication station. The base communication station receives the processed image signal. The base communication station can include an image processor to further process the processed image signal from each of the plurality of vehicles to form an output signal and a transmitter that transmits the output signal. The output signal can be used to control traffic control devices, vehicles and to provide other useful information.

14 Claims, 7 Drawing Sheets

(56) References Cited

OTHER PUBLICATIONS

Uwe Franke et al. "Vision based Driver Assistance in Urban Traffic" <URLhttp://goerzig.org/user_resources/157963/uploadedfiles/its2000.pdf.gz> downloaded from Internet, Nov. 21, 2012.

How to report faulty traffic lights, downloaded from WWW http://www.salford.gov.uk/trafficlights.htm, Nov. 15, 2010.

Traffic light blamed in Staten Island collision working again, Oct. 1, 2008 downloaded from WWW http://www.silive.com/news/index.ssf/2008/10/traffic_light_blamed_in_staten.html.

Focus on congestion relief, downloaded from WWW http://www.fhwa.dot.gov/congestion/describing_problem.htm, Nov. 15, 2010.

* cited by examiner

MOBILE SENSING FOR ROAD SAFETY, TRAFFIC MANAGEMENT, AND ROAD MAINTENANCE

CROSS-REFERENCE TO RELATED APPLICATIONS

This application claims the benefit of U.S. Provisional Application No. 61/253,870, filed Oct. 22, 2009, which is incorporated herein by reference.

BACKGROUND OF THE INVENTION

The present invention relates to methods and apparatus for a traffic management systems. In particular, it relates to mobile sensing platforms that can be used in a traffic management system.

Traffic is a major problem today. Increased traffic impacts schedules, pollution and driver safety. It can also overload a driver's perceptions and cause the drive to operate a vehicle unsafely. Systems and methods to help improve traffic flow are needed.

The infrastructure needed to support today's heavy traffic demands is also growing. Maintaining that infrastructure is a complicated task. The failure to properly maintain today's road infrastructure can have devastating effects. For example, if a traffic light is not properly maintained or becomes dysfunctional, major problems can occur. Accidents can occur because traffic lights do not work and can create a very hazardous condition.

Accordingly, novel and improved methods and apparatus for mobile sensor platforms without requiring modification of the road infrastructure are required.

SUMMARY OF THE INVENTION

In accordance with an aspect of the present invention methods and systems are provided for creating a mobile sensing platform for traffic related and driver related conditions.

In accordance with one aspect of the present invention, a mobile monitoring system is provided. The system includes a plurality of vehicles and a base communication stations. Each of the plurality of vehicles includes one or more cameras that generates image data, a location device that generates geographic coordinates of the vehicle, a computing device that receives the image data from the camera and the geographic coordinates of the vehicle and forms a processed image signal that includes the image data, the geographic coordinates and a time stamp. Each of the plurality of vehicles also includes a communication device that receives the processed image signal from the computing device and wireless transmits the processed image signal.

The base communication station is in communication with each of the plurality of vehicles to receive the processed image signal, the base communication station includes an image processor to further process the processed image signal from each of the plurality of vehicles to form an output signal and a transmitter that transmits the output signal.

Each of the plurality of vehicles is selected from a group consisting of a bus, a tram, a taxi, a delivery truck, a police car, a service vehicle, an ambulance and combinations thereof.

The base communication station can send the output signal to one of the plurality of vehicles to provide instructions to the driver of the vehicle. It can also be sent to one of the plurality of vehicles to control the camera, the location device, the computing device or the communication device. It can also be sent to another vehicle to provide instructions to a driver of the other vehicle.

In accordance with a further aspect of the present invention, the camera in at least one of the plurality of vehicles is configured to create images of a traffic control device and the processed image signal includes images of the traffic control device. The base communication station processes the processed image signal to determine an operation of the traffic control device and if the operation is determined to be defective, the output signal includes information about the operation and location of the traffic control device. The traffic control device can be a traffic light. It can also be a lane changing signal.

In accordance with another aspect of the present invention, the camera in one or more of the plurality of vehicles is configured to create images of nearby traffic flow and the processed image signal from each of the one or more of the plurality of vehicles includes images of nearby traffic flow. The base communication station processes the processed image signal from the one or more of the plurality of vehicles to determine an status of the traffic flow in an area. It then configures the output signal to control a traffic control device in the area based on the status of the traffic flow in the area and transmits the output signal to the traffic control device in the area.

Again the traffic control device can be a traffic light. It can also be a lane changing signal.

In accordance with another aspect of the present invention, one or more of the plurality of vehicles further include a carbon monoxide sensor which provides an output to the computing device and the processed image signal from the one or more of the plurality of vehicles includes a level from the carbon monoxide sensor. Of course, the carbon monoxide detectors can be provided independently from the image processing components discussed so far. The base communication system processes the processed image signal from the one or more of the plurality of vehicles to determine the carbon monoxide level in an area. The base communication system sends the output signal based to a traffic controller device based on the carbon monoxide level in the area.

In accordance with a further aspect of the present invention, a database of suspicious vehicles is provided. The camera in one or more of the plurality of vehicles is configured to create images of nearby vehicles and the processed image signal from each of the one or more of the plurality of vehicles includes images of nearby vehicles. The base communication station processes the processed image signal from the one or more of the plurality of vehicles to determine one or more features of the nearby vehicles. The base communication station compares the one or more features of the nearby vehicle to the database of suspicious vehicles. The base communication station then transmits the output signal based on the comparison of the one or more features of the nearby vehicles to the database of suspicious vehicles.

In accordance with another aspect of the present invention, a fixed sensor having a camera that generates an image of a traffic flow in an area and a transmitter that sends the image of the traffic flow to the base communication station is provided. The base communication station processes the processed image signal from the plurality of vehicles and the image of the traffic flow to generate the output signal. The base communication station transmits the output signal based on the comparison of the one or more features of the nearby vehicles to the database of suspicious vehicles.

In accordance with yet another aspect of the present invention, the processed image signal in one or more of the plurality of vehicles includes a number of vehicle passengers, an average vehicle speed and a vehicle time table. The base communication station processes the processed image signal from the one or more of the plurality of vehicles to configure the output signal based at least in part on the number of vehicle passengers, the average vehicle speed and the vehicle time table. The base communication station transmits the output signal to the traffic control device to control the traffic control device.

In accordance with another aspect of the present invention, the base communication station processes the processed image signal from one of the plurality of vehicles to determine whether the vehicle is being driven safely and configures the output signal based on whether the vehicle is being driven safely.

The present invention includes method counterparts to the various systems described above.

In accordance with one aspect of the present invention, the method includes the steps of generating image data with a camera in a plurality of vehicles, generating geographic coordinates of the plurality of vehicles with a GPS device in each of the plurality of vehicles, in a processor in each of the plurality of vehicles, generating a processed image data from the image data, from the geographic coordinates and from a time stamp, transmitting the processed image data from each of the plurality of vehicles to a base communication station, processing the processed image signal from each of the plurality of vehicles at the base communication station to generate an output signal and the base communication station transmitting the output signal to a traffic control device to control the traffic control device.

DESCRIPTION OF A PREFERRED EMBODIMENT

In accordance with one aspect of the present invention, public vehicles are used as a mobile sensor platform for traffic control or management purposes. Of course, other vehicles can be used as well.

Maintenance of various traffic infrastructure devices, such as traffic lights, and assessment and control of traffic situations require a consistent monitoring of multiple areas and locations of roads and traffic situations. One solution that is currently applied is to install assets such as cameras and sensors along or even in the road. Considering that there are may locations that deserve monitoring it is not always practical or economical to install fixed sensors such as cameras. There are, however, fleets of vehicles that already drive a wide area of roads. These fleets include buses for public transportation, United States Post Office delivery trucks, local and state police cars, taxis and the like. In many cases arrangements can be made with other fleet owners to collaborate in infrastructure and traffic monitoring.

Clearly, drivers of vehicles are focused on their specific tasks and on driving safely, so any traffic or road monitoring has to be performed automatically, without interference or support or if required only minimal support by a human driver.

As an aspect of the present invention, a traffic monitoring system and a traffic infrastructure monitoring system is provided with a plurality of automatic mobile monitoring platforms, each located on a vehicle, which is preferably a public service vehicle, and is able in a first embodiment to collect and/or record traffic and/or road data by using at least one sensor, which is preferably a camera and associate the traffic and/or road data with a geographical location and transmit the collected and/or recorded traffic and/or road data via a wireless transmission to a remote computer system.

Figure 1:
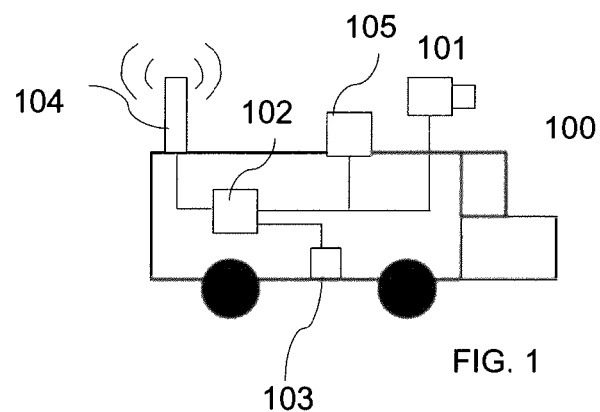
FIG. 1 is a diagram of a system on a vehicle that performs tasks of a mobile monitoring platform in accordance with an aspect of the present invention.

A mobile traffic and/or road monitoring system, in accordance with one aspect of the present invention is illustrated in FIGS. 1-5. FIG. 1 illustrates a mobile monitoring platform that is installed on a vehicle 100, which may be a bus. The vehicle has at least a first sensor 101, which is a camera. One or more cameras can be provided on the vehicle 100. The camera 100 is connected to a processor or computing device 102 which has also memory and or a storage device to store data and instructions. The mobile monitoring platform in a further embodiment also has at least a device 103 which is preferably a device that enables to generate a reasonably accurate geographical location of the vehicle 100. In a first embodiment, the accuracy is in a range of 3 feet or less. In a second embodiment, the accuracy is better than 10 feet. In yet a further embodiment the accuracy is better than 100 feet. In one embodiment device 103 includes at least a GPS device. The GPS device 103 is connected to the processor 102.

The vehicle 100 further has a communication device 104 with an antenna that is connected to the processor 102. The communication device 104 is enabled to transmit recorded data from computer device 102 in a wireless manner to a remote system, also known as a base communication system that is enabled to receive and process the transmitted data from system 102.

A carbon monoxide sensor 105 can also be provided in the vehicle 100. The carbon monoxide sensor 105 can be connected to the processor 102. In general, the processor 102 collects information from the camera 101, the GPS device 103 and the carbon monoxide sensor 105, adds a time stamp, and sends the processed signal to the communication device 104 for transmission.

Several applications of a mobile monitoring system based on a plurality of mobile monitoring platforms and communications with a remote system will be provided later. In one embodiment a mobile platform will collect and record data which includes image data, time stamp the data and associate the data with a geographical or location stamp. The collected data may be compressed and then transmitted wirelessly to the remote system.

It is well known that image data is quite voluminous and it may not be practical to constantly transmit real-time full video frame images to the remote system. In one embodiment the system 102 may be programmed to record images intermittently, for instance every second, or every 0.1 second or every 10 seconds. A system 102 may also be programmed to store collected image data on a storage medium and select samples, for instance every 0.1 second or every 1 second or every 10 second for transmission to a remote system.

Figure 2:
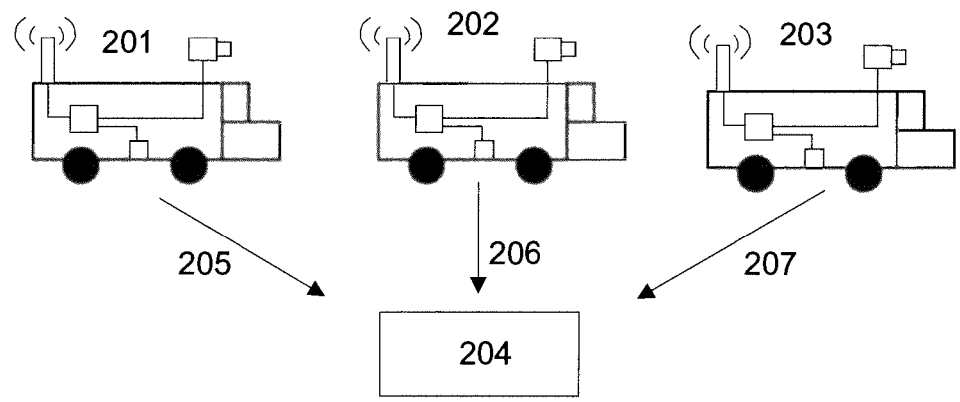
FIGS. 2 to 5 illustrate a mobile monitoring system in accordance with one or more aspects of the present invention.

One embodiment of a mobile traffic/road monitoring system is illustrated in FIG. 2. Such a system includes at least two vehicles 201 and 202 as mobile monitoring platforms as illustrated in FIG. 1. Preferably, the system further includes also at least a vehicle 203 that is a mobile monitoring platform. Of course, more image detecting vehicles can be provided as well. Each vehicle is enabled to transmit data wirelessly, for instance through channels 205, 206 and 207, to a base communication station 204. The base communication station 204 collects data, including image data, and is programmed to process the data, for instance by using image processing software which included object recognition software. Thus, the base communication station 204 includes an image processor.

Figure 3:
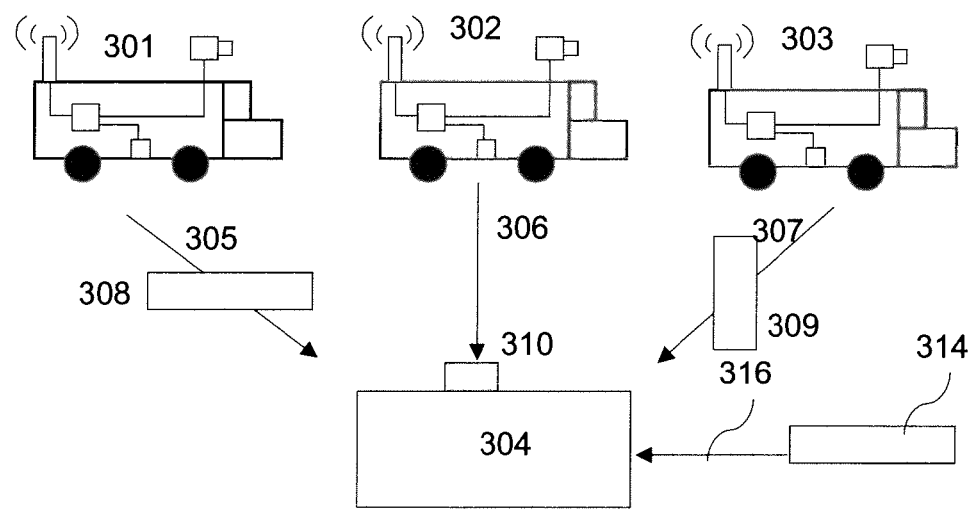

A further embodiment of a mobile traffic/road monitoring system is illustrated in FIG. 3. There are many ways to transmit data from a vehicle to a remote system. For instance a vehicle 302 has a direct radio connection 306 to a remote system 304 with a receiver 310. A vehicle 301 has a mobile phone type connection 305 with a network device 308 that connects to remote system 304. A vehicle 303 has a mobile connections, for instance via a Bluetooth or WiFi connection 307 via a device 309 that connects to remote system 304. The intermediate devices 308 and 309 allow connection to landlines to connect to remote device 304.

One can use a very powerful remote computer 204/304 or a remote system 204/304 that is distributed, which allows the processing, which may include object recognition, of the received image data. For instance, each mobile platform may have its own remote processor that processes images.

While not specifically shown, it is assumed that a remote system 204/304 has a capability to communicate with the outside world through a communication interface that connects to a network that receives data from a mobile monitoring platform. A remote system 204/304 includes at least a processor that is programmed to execute instructions, memory to store data and instructions, a receiver to receive data and a transmitter to transmit data.

As shown in FIG. 3, the system may include a fixed sensor 314 that has a camera that generates images of traffic in a fixed area. The sensor 314 communicates with the base communication station 304 over the communication link 316.

As was discussed above, it may not be practical to transmit great amounts of data from a mobile platform to a remote system to be processed. With increasingly powerful processors and software it may be beneficial to have the system 102 in each vehicle at least pre-process recorded data before it is transmitted to the remote system. For instance, software to recognize certain objects, such as a traffic light, may be installed on a system 102. A system 102 may also be programmed to decide if a traffic light is working properly. Only if it has been decided that for instance a traffic light is not working properly, does the system 102 send an image of the recorded image.

Figure 4:
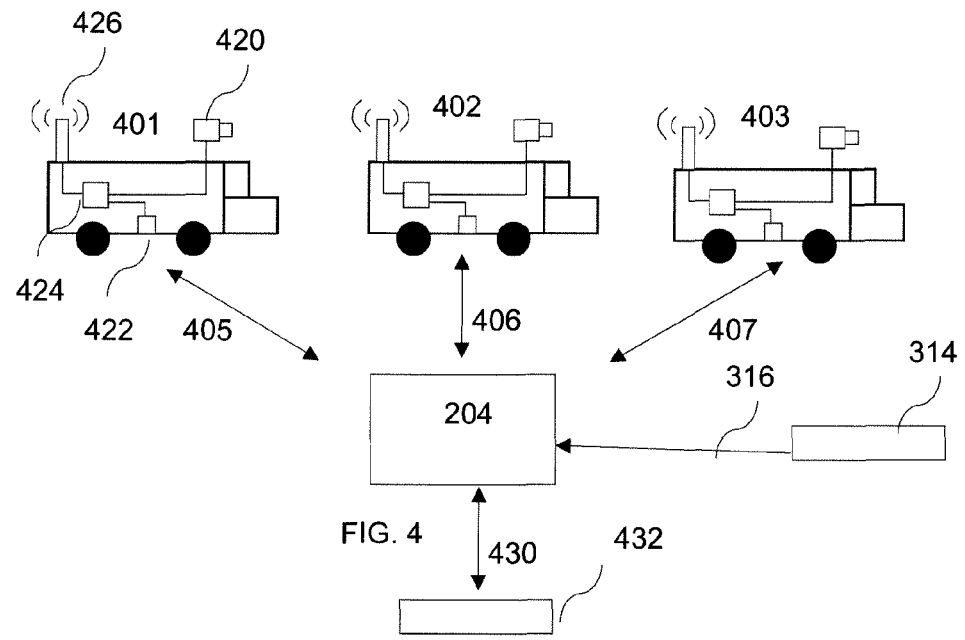
Figure 5:
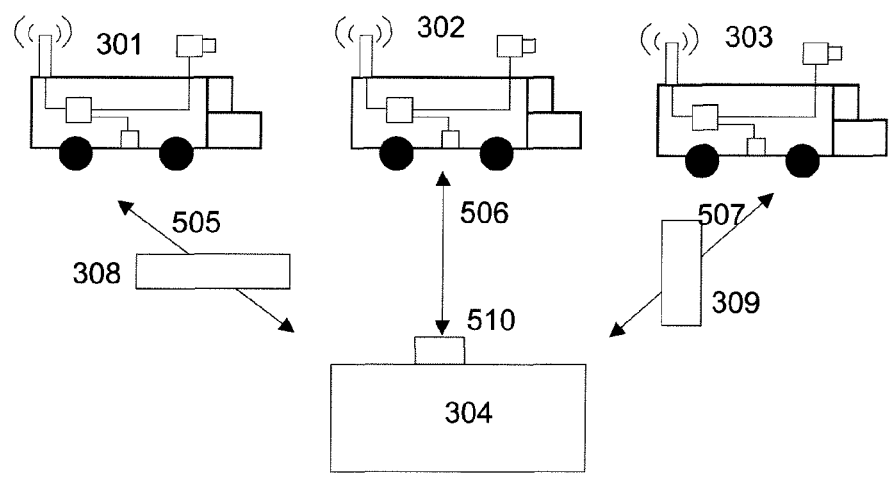

It has already been noted that it may not be practical to constantly send data from a mobile platform to a remote system. In one embodiment the computing device 102 on a mobile platform is programmed to determine when to send data, which makes a mobile platform fairly autonomous to decide when to send data. In a further embodiment a mobile platform and a remote system can exchange information in bi-directional communication. This is illustrated in FIGS. 4 and 5. These figures have the same components as in FIGS. 2 and 3, with as difference that connections 405, 406 and 407 and 505, 506 and 507 are bi-directional channels. Furthermore, a direct link between 304 and 302 is supported by a receiver/transmitter 510.

Such bi-directional communication allows a remote system 204/304 to act as a controller and provide instructions to a mobile monitoring platform. For instance, the remote system 204/304 may instruct a specific mobile platform to transmit image data (or perhaps air quality data) based on a physical location.

A remote system 204/304 may also transmit data that is helpful for a system on a mobile monitoring platform to detect or recognize an object. For instance, it may transmit a template that will facilitate recognition of an object. Such a template may be a template of a traffic light at a certain location, or it may be a template of a license plate of car with data related to its location, shape, color and the like. This allows a mobile monitoring platform to be provided with the most recent and relevant data.

In a further embodiment, each vehicle is provided with a unique identifier. Each vehicle transmits on a regular basis a message to the remote system that contains at least a location stamp, a time stamp and its unique identifier. This allows the remote system to determine travel times and travel speed of a vehicle that is a mobile monitoring platform. It also allows a remote system to instruct vehicles that are in a certain geographical area to execute certain instruction, such as locating a traffic light at a specific location or detecting a vehicle or an object in a certain suspected area. Clearly, it only burdens vehicle systems that are not even close to a suspected area or an area of interest with data and instructions that will not lead to useful results.

In a further embodiment a mobile monitoring platform may request data to facilitate recognition of an object. For instance, an image recognition program on one or more mobile monitoring platforms is unable to recognize or detect a traffic light at a certain location. It may request data, such as a stored template of the traffic light, including its physical location from remote system 204/304 to facilitate detection. The physical location data allows a program to limit its search area. A template (for instance a horizontal traffic light with four lights) may facilitate a program to detect a traffic light that is out of order and so no different active lights can be used to detect.

As shown in the figures, and specifically in FIG. 4, a mobile monitoring system, in accordance with an aspect of the present invention, includes a plurality of vehicles 401, 402 and 403. Each vehicle includes a camera 420 that generates image data, a GPS device 422 that generates geographic coordinates of the vehicle and a computing device 424 that receives the image data from the camera 420 and the geographic coordinates of the vehicle from the GPS device 422. The computing device 424 can be a microprocessor based circuit. It forms a processed image signal that includes the image data, the geographic coordinates and a time stamp. Each vehicle also includes a communication device 426 that receives the processed image signal from the computing device and wireless transmits the processed image signal. The base communication station 204 is in communication with each vehicle to receive the processed image signal. The base communication station 204 can include an image processor to further process the processed image signal from each of the plurality of vehicles to form an output signal. The output signal is transmitted from the base communication station 204.

Each of the plurality of vehicles can be selected from a group consisting of a bus, a tram, a taxi, a delivery truck, a police car, a service vehicle, an ambulance and combinations thereof.

The output signal can be sent to one of the plurality of vehicles 401, 402 or 403 to provide instructions to the driver of the vehicle. In the case of issuing instructions to a driver of a vehicle the vehicle is provided with a human interface such as a display and/or a speaker or other audio device to provide an audio alert. Additionally, the output signal can be sent to one or more of the plurality of vehicles 401 to 403 to control the camera 420, the location device 422, the computing device 424 or the communication device 426.

The output signal can also be sent to another vehicle 432, for example via communication link 430, to provide instructions to a driver of the other vehicle.

More specific embodiments of a mobile monitoring system for traffic/road data that includes at least a remote system and a plurality of mobile monitoring platforms connected with the remote system through wireless connections are provided below.

The present invention has application in automated traffic lights monitoring systems. The traffic light, also known as traffic signal, stop light, traffic lamp, stop-and-go lights, robot or semaphore, is a signaling device positioned usually but not exclusively at a road intersection, pedestrian crossing, or other location. Its purpose is to indicate, using a series of colors (Red—Amber or Yellow—and Green), the correct moment to stop, drive, ride or walk, using a universal color code (and a precise sequence, for those who are color blind). Usually, traffic lights are installed in junctions with a poor accident record or congestion caused by high traffic volumes to improve and smooth traffic flows. Locations of traffic lights are identified using traffic surveys and data from crash sites to decide whether traffic lights would make a junction safer.

Maintenance of traffic lights is crucial for road safety. Nowadays, maintenance is done through periodic such as monthly, semi-annual, and annual inspection routines. These routines inspect and fix several physical faults and timing problems with the traffic light such as:

Some or all lights not working
Lights not changing/takes too long to change
Lights pointing in the wrong direction
Not changing for pedestrian/pedestrian crossing buttons not working
Lights damaged and in a dangerous condition.
Traffic lights out of alignment
Unusual traffic queues In addition, several districts and counties urge people to report any faulty traffic light using hot-line number or by submitting online form such as described in <URLhttp://www.salford.gov.uk/trafficlights>. However, major accidents and traffic congestions happen due to faulty traffic lights that haven't been reported promptly. For example, a report on April 2007 indicates that due to timing problem in the left-turn only signal that does not clear the 10 to 20 cars backed up for the left turn, encourages 1-3 motorists to speed up and try to make the light! This often leaves a car in the intersection and in the path of on-coming (50 mph) traffic. See, for example, the internet link at <URLhttp://newsgroups.derkeiler.com/Archive/Rec/rec.travel.usa-canada/2007-04/msg00459.html>. Very recently, as described in: <URLhttp://www.silive.com/news/advance/index.ssf?/base/news/1222862407214170.xml&coll=1>, a non-working traffic light led to a collision between city bus and sport-utility vehicle on Oct. 1, 2008. Similar faulty traffic lights lead to chaos and congestions on roads as has been described in <URLhttp://www.acadvertiser.co.uk/lanarkshire-news/local-news/airdrie-news/2008/08/06/green-for-go-afterlights-fault-is-fixed-65864-21470832/> and <URLhttp://www.highbeam.com/doc/1P2-10388548.html>.

A significant task for traffic light maintenance process is monitoring the condition of traffic lights and reporting back any sign of malfunction. However, current monitoring mechanisms for traffic light are limited and infrequent due to the costs and man power associated with it.

Fortunately, a public transportation unit or a public utility vehicle, which include but is not limited to a bus, a trolley, a taxi, a police car, a train, a trolley car, an ambulance, and a fire truck contain properties that are useful to solving this problem. Other sources owning one or more vehicles may volunteer or offer for payment to participate in an imaging program in accordance with at least one aspect of the present invention and may include for instance a company owning delivery and/or maintenance vehicles. In fact any vehicle that travels a certain area frequently on a day is a candidate for serving as an imaging platform.

In one embodiment of the present invention, the available vehicles are provided with sensors and other resources to provide monitoring and reporting apparatus related to the condition of the traffic lights. This establishes an automated and distributed traffic light health monitoring system. The system uses a fleet of public vehicles (e.g. taxis, police cars, public transportation buses) to acquire data about traffic light operation and a central server to integrate information received from sensing platforms and generate warning/repair orders.

The above system should address several issues.

1. Even small cities may have traffic lights of different generations and/or configurations. For instance, a traffic light may be positioned in a horizontal or in a vertical orientation. It may have 3 lights (red-yellow-green) or 4 or more lights (red-yellow-green—green left turn—green red turn—etc). Accordingly, a system in a vehicle should be able to recognize between at least two formats of traffic lights.

Figure 6:
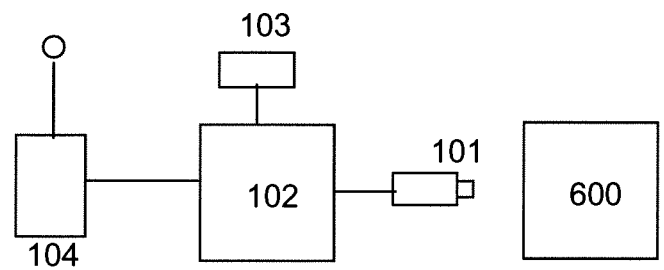
FIG. 6 is a diagram of a mobile imaging platform in accordance with an aspect of the present invention.

FIG. 6 further illustrates part of a system in accordance with the present invention. A vehicle has a camera system 101 that has at least one camera. As previously described, the camera 101 is connected to a processor 102 with memory. The system is connected to and can obtain data from a navigation system 103 which in one embodiment of the present invention contains a GPS system or a geographical positioning device that determines its geographical position and provides the related geographical coordinates in an electronic manner. The navigation system 103 enables the system 102 to determine a location and an orientation or direction of the vehicle or the cameras on which it is located. The camera 101 is oriented to point to a traffic light 600. In one embodiment of the present invention, the system 102 may be an autonomous detection system, which will search within a search range of image data provided by cameras 101 for an object that may be a traffic light, based on data that is stored in a memory of the system. The system in one embodiment of the present invention is provided with data related to possible traffic lights that can occur on a traveling route of the vehicle on which the system 102 is installed.

Such traffic light detection systems are known and have been disclosed, for instance, in the article by Uwe Franke et al. "Vision based Driver Assistance in Urban Traffic"<URLhttp://goerzig.org/user_resources/157963/uploadedfiles/its2000.pdf.gz> which applies three steps: color segmentation, filtering and classification. This article is incorporated herein by reference.

2. The system 102 must detect the traffic light in a traffic scene. Traffic lights may be positioned at different heights and in different locations (on a corner or hanging above an intersection). A specific traffic intersection may have a very specific traffic light. Rather than using a substantially autonomous search algorithm one may provide a system 102 with relevant data of existence of a traffic light and type/format of a traffic light, number of traffic lights and which traffic light will directly control a traffic flow relevant to the vehicle of the system, depending of course on its orientation. Such data may be associated with GPS or navigation data that is provided by navigation/GPS system 103. Furthermore, spatial information, such as height, position, orientation, and location of the actual light containing structure as well as the type of traffic light is either stored in 102 or can be made available to 102 by way of a wireless connection via a wireless communication device 104. Based on navigation data provided by navigation/GPS system 103, system 102 is alerted that it is approaching a traffic intersection with a traffic light that needs to be detected. The general spatial position of the traffic light, its orientation and type is made available either from memory in 102 or via wireless device 104 which has access to a database with such information and downloads this data to system 102. Based on the spatial location of the vehicle and the known shape and location of the traffic light, the system can detect relatively quickly the traffic light by limiting a detection or search algorithm to the image area generated by the camera or cameras 101 that corresponds to the expected or calculated location of the traffic light in the image. Furthermore, the system 102 in one embodiment of the present invention is also provided with the type and orientation of the traffic light. In that case for instance only a single search template has to be applied to detect the specific traffic light.

It will be explained below that a mobile imaging platform on a vehicle can perform many tasks. In a further embodiment of the present invention a central system may instruct a system on a specific vehicle to analyze a specific traffic light. For instance, it is known that a vehicle with an imaging platform approaches a traffic light of which it is suspected that there is a malfunction or whereof the timing of changing lights is not optimal. The central system instructs the system on the specific vehicle to record images and potentially analyze the images of the specific traffic light. The central system in a further embodiment provides the system on the vehicle with data that helps the system to locate and to identify the traffic light, such as a template of the traffic light which may include an orientation of the traffic light.

In one embodiment at least one of the lights in the traffic lights is applied to detect the traffic light. Assuming that a traffic light may have a light that is broken, it is preferred that the traffic light is first detected by using its shape. For instance a traffic light in general has a rectangular shape containing 3 round shapes in a single line. With a general location known it is possible to detect the traffic light with the system 102 which includes a vision system. In a further embodiment the actual lights may also be used to detect the traffic light. Other stable structures around the traffic light can be used as a reference during detection. This is especially useful when the lights are out.

3. Problem identification for faulty or non-optimal traffic light.

After the traffic light has been detected, the system 102 should analyze the lights of the traffic light to assess its correct operation. This requires that the system 102 is programmed to determine if a light in the traffic light is on or off. Detecting a traffic signal including detecting a traffic light from an image is described in for instance U.S. Pat. No. 6,859,546 to Matsukawa et al. issued on Feb. 22, 2005 and U.S. Pat. No. 5,638,116 to Shimoura et al. issued on Jun. 10, 1997 and which are incorporated herein by reference. Also detection of lights such as arrow lights is known and has been described for instance in Kuo-Hao Lu et al. "Traffic Light Recognition" Journal of the Chinese Institute of Engineers, Vol. 31, No. 6, pp. 1069-1075 (2008) which is incorporated herein by reference. The system tracks the traffic light while the vehicle is moving or when it stands still. This allows the system to further analyze the traffic light. The system may determine that no lights of the traffic light are working. For instance, the traffic light may be out and traffic police controls the traffic. During the time that the traffic light is captured by the vision system in the moving vehicle no light has been detected and no change of light has been detected. This event will be stored in the memory of the system 102 and may be combined with a time stamp and/or a location stamp and may be associated with an image of the traffic light that is also stored.

In a different scenario a light is green while the vehicle is moving and the system captures and analyzes the image of the traffic light. It may detect that the green light switches off and no yellow light appears. In yet a different scenario the vehicle waits for a red light of the traffic light. The system may record the time that the light is red. It can check that time against a stored time in the system. If the vehicle has to wait significantly longer for a red light than indicated by the stored value it generates a report, containing an identifier of the location and the traffic light, a time stamp and a fault report.

In yet a different scenario, a vehicle is waiting for a traffic light with a "left green arrow." A vehicle that is waiting at a traffic light to make a left turn may detect that the left green arrow is not working and create a fault/problem report.

The system 102 creates a fault/problem report that is provided in an appropriate message format to wireless device 104 that transmits the message to a receiver. The receiver may disassemble the message and provide relevant content for instance to a database or a traffic management center. Alternatively, the vehicle with the camera 101 installed can transmit an image signal in the manner already discussed, and the base communication station can process the image from the vehicle and determine whether the light 600 is faulty or not.

Figure 7:
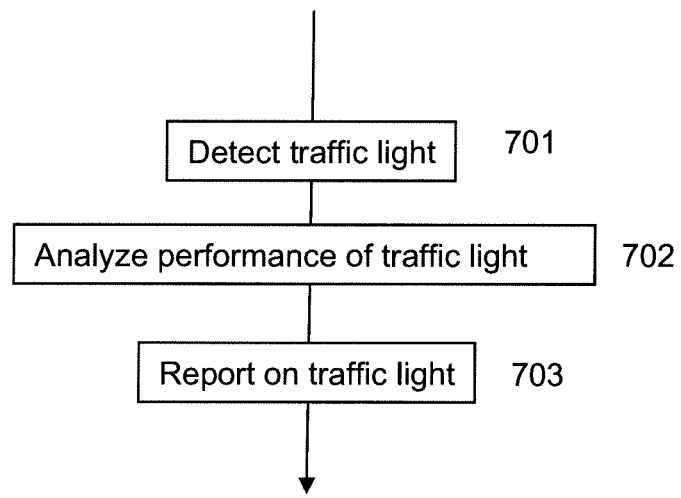
FIG. 7 illustrates steps of a method of a mobile imaging platform in accordance with an aspect of the present invention.

The steps of the method to determine a faulty traffic light are illustrated in FIG. 7. In step 701 a traffic light is detected. In step 702 the system 102 analyzes the image and may compare it against stored data to determine if a problem situation exists. In step 703 a problem report is created and transmitted to a receiver. In a further embodiment a receiving system analyzes the problem report and decides that the traffic light is faulty and repair or maintenance is required. The receiving system then issues a request for repair or a repair order to a maintenance department in a maintenance message. As mentioned above, the image processing to determine whether the traffic light 600 is faulty can be performed in the base communication station instead of the vehicle.

Figure 8:
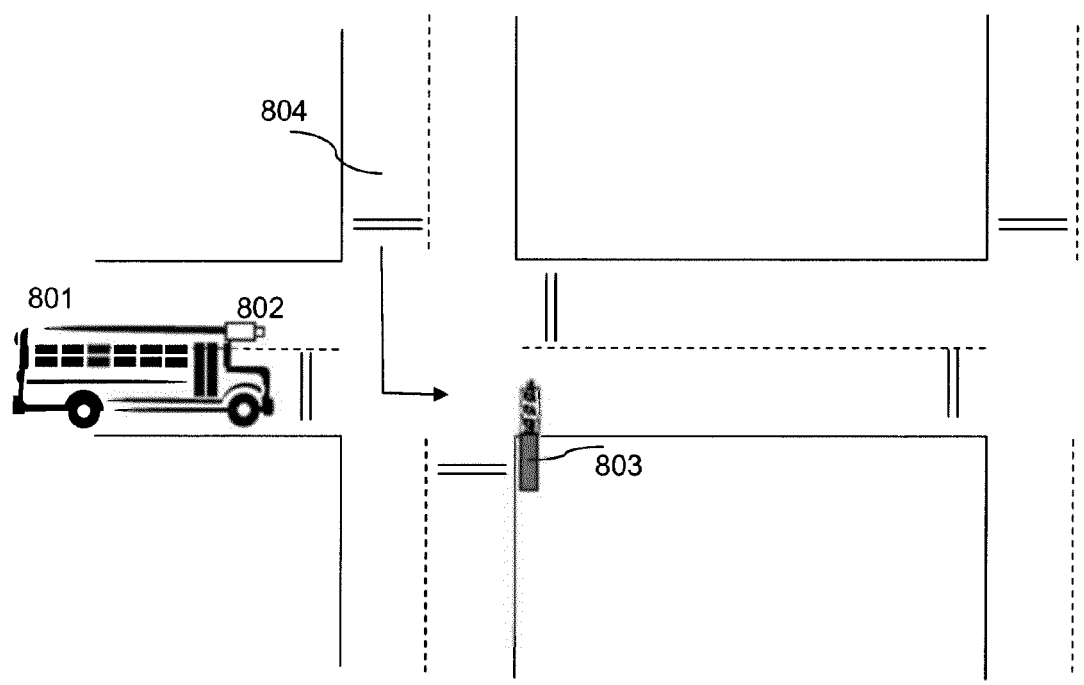
FIG. 8 illustrates an embodiment of the present invention in a traffic situation in accordance with an aspect of the present invention.

A traffic scenario is illustrated in FIG. 8. A vehicle (bus) 801 has a vision system with at least one camera 802 and preferably two or more cameras. The system is trained to detect a traffic light 803 and to assess if a problem exists and to send a report. The base communication station may send an output signal to the vehicle 801 based on the location of the vehicle 801 to orient the camera 802 to clearly obtain an image of the light 803. In a more complex situation the bus 801 may be in position 804 to make a left turn. The system is programmed to assess if the left turn green works and to prepare and transmit a problem report if the traffic light doesn't work.

There may be some failure rate in the detections and assessments of a vehicle based system. It is contemplated that at least several vehicles with a vision system in accordance with an aspect of the present invention may cross an intersection during a period. One may base any action on a problem report on a repeat of such a report. If several vehicles report a problem with a traffic light, then it may be decided that the problem is real. If only a first of several subsequent system enabled vehicles during a period reports a problem, then a faulty detection may be assumed.

Thus, in accordance with an aspect of the present invention, the camera 802 in one or more vehicles 801 is configured to create images of a traffic control device 803 and the processed image signal generated by the components in the vehicle 801 includes images of the traffic control device 803. The vehicle 801 includes the camera, GPS, processor and communication circuit previously discussed. These images are transmitted to the base communication station which processes the processed image signal to determine an operation of the traffic control device 803. If the operation is determined to be defective, base communication station generates an output signal that includes information about the operation and location of the traffic control device 803. This information can be transmitted by the base communication station to another vehicle so that the traffic control device 803 can be maintained or repaired.

The traffic control device 803 can be a traffic light as indicated or a lane changing signal.

The present invention also has application in a mobile traffic monitoring system. With the number of vehicles on the road increasing rapidly around the world, traffic monitoring becomes an important task to allow the smooth flow of traffic. In the United States alone, congestion causes 4.2 billion hours extra travel every year and the purchase of extra 2.9 billion gallons of fuel for a congestion cost of USD 78 billion, according to the 2007 Urban Mobility Report, September 2007, Texas Transportation Institute, David Schrank & Tim Lomax. The provision of up-to-date, accurate and detailed quantitative information on traffic movement is essential in road traffic management. Traffic monitoring nowadays is accomplished through installing monitoring devices on fixed points along the road. However, such a monitoring system is very costly since it requires large deployment to cover large areas in addition to its continuous maintenance.

Figure 9:
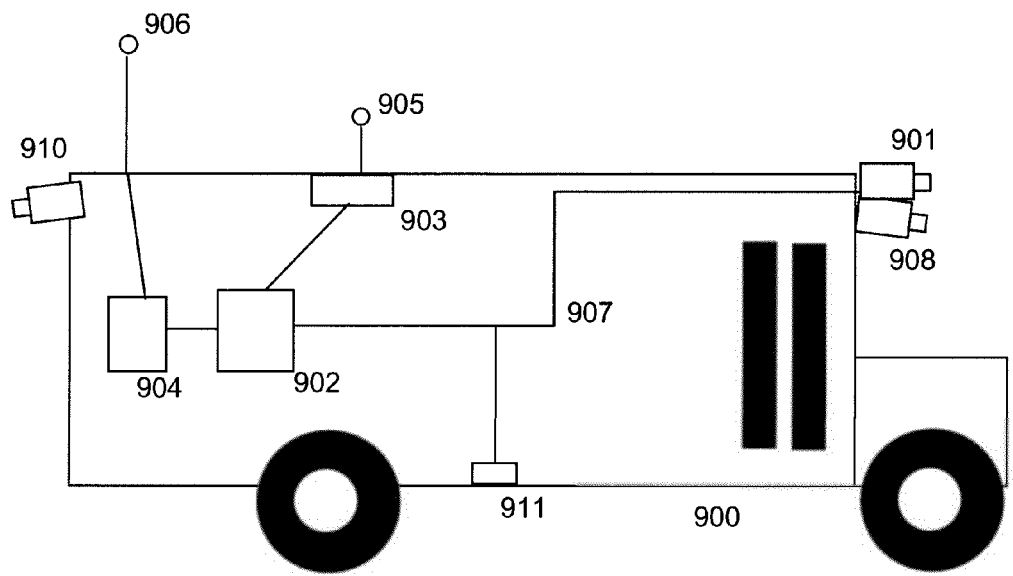
FIGS. 9 to 11 illustrate a vehicle with a mobile imaging platform in accordance with an aspect of the present invention.
Figure 10:
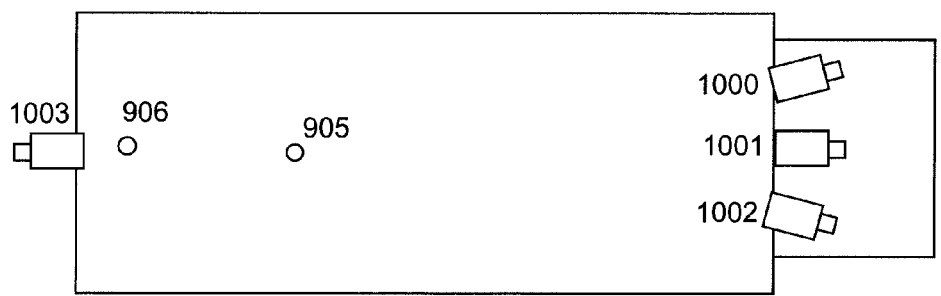

In an embodiment of the present invention an automated and distributed traffic monitoring system is provided. The system uses a fleet of vehicles (e.g. taxis, police cars, public transportation buses) to stream periodically images of traffic condition for flow control in addition to other statistics like average speed at certain intersections or road portions. Traffic analysis from video images is well known. Counting of vehicles in traffic lanes is also known. Such system of video based vehicle counting in one embodiment of the present invention is adapted to be installed on a vehicle that moves through traffic. FIG. 9 illustrates one embodiment of a video system installed on a bus 900. The system can also be installed on other vehicles, such as taxis or police cars and on other vehicles as are described above. For counting vehicles, a position of cameras 901 and 902 on a significant height on the vehicle as shown in FIG. 9 provides an advantageous overview of traffic. The system has at least one camera 901 which is connected via a connection 907, which may be a wireless connection or a wired connection, to a computer device or system 902. Preferably, the system is provided with multiple cameras, such as 901, 908 and 910. Other camera configurations are fully contemplated of which one is illustrated in FIG. 10. For instance a camera 901 is used to cover an area that has a greater distance from vehicle 900 than camera 908 which covers an area that is nearer to the vehicle. Camera 910 is applied to view an area behind the vehicle 900. Other camera configurations are fully contemplated of which one is illustrated in FIG. 10 wherein cameras 1000, 1001 and 1002 are provided to cover a wide viewing range. Camera 1003 covers an area behind the vehicle. In a further embodiment of the present invention the computer device 902 is connected to a navigation/GPS system 903 with an antenna 905 that provides spatial information of a position of the vehicle and that in a further embodiment of the present invention provides spatial information of permanent or semi-permanent structures and that can be used as a reference point. The system also includes a communication device 904 with an antenna 906 that can communicate wirelessly with a remote system. In a further embodiment of the present invention the communication device 904 can transmit data received from computer device 902 and can receive data that can be provided to the computer device 902. For instance such data provided to computer device 902 can include instructions, for instance to start transmitting image data generated by a camera.

In one embodiment of the present invention, the system includes at least one sensor 911, such as a velocity sensor or the speedometer of the vehicle, which is connected to the system 902. The system may also include other sensors such as a carbon-monoxide sensor, a water sensor, a light sensor or any other sensor for an environmental property that has significance for a traffic condition. At a certain time the system starts recording images generated by a camera on the vehicle to provide an image of a traffic flow. The system 902 combines the image data with a time stamp and positional data and/or with any other relevant data such as the speed of the vehicle. The system 902 processes the data into an appropriate format and provides it to the communication device to be transmitted to the remote system. In a further embodiment an on-board computer system performs traffic analysis using the recorded images. In yet a further embodiment, recorded image data is transmitted to a remote computer system for traffic analysis.

It is believed that as few as 5% of vehicles need to be equipped for such systems to be effective. The video system can also be used to count the number of vehicles or assess traffic density in adjoining lanes and measure flow speed, helping to alert a city traffic-monitoring centre of road conditions on the ground, in real time. Consequently, it could help optimize the timing synchronization of multiple traffic lights.

In a further embodiment a system as disclosed herein is integrated with a Siemens' roadside's traffic control and monitoring system and/or Siemens On Street Equipment for Traffic Solutions to provide more flexible and wider coverage of traffic at lower costs. For example, by adding carbon-monoxide sensors on mobile units, one can measure the pollution across certain paths or at intersections that indicates traffic congestion along certain paths or at intersection. Hence, one may adjust the timing function of the traffic lights in real time to reduce congestion, increase traffic flow, reduce pollution, and save gas consumption (Green Mobility). This system could extend the functionality of Siemens' Apollo roadside pollution management system.

In a further embodiment of the present invention, some traffic processing can be performed by the computer device 902. Software that counts vehicles can be installed on computer device 902 and allows estimating a traffic flow taking into account its own speed. For instance, if a vehicle speed is close to a maximum speed and few vehicles are detected, there is a small immediate chance for traffic congestion. In such a condition there is limited need for a vehicle to burden a remote system with streaming data, unless it was requested to do so. When a speed of a vehicle is significantly below a maximum speed for a significant time and there is a significant number of vehicles in a traffic lane, then this may be an indication of congestion or impending congestion. In one embodiment of the present invention, the computer device 902 may generate autonomously streaming traffic data to the remote system, for instance based on criteria or conditions that indicate a traffic congestion or an impending traffic congestion. The computer device may also send an alert to the remote system with a request to start streaming data such as image data. The remote system, if itself is being congested with data from mobile platforms may instruct computer device 902 to estimate a traffic flow and transmit summarized data.

In one embodiment of the present invention, the computer device 902 works in a remotely controlled mode, for instance controlled by a remote traffic controller. In yet a further embodiment of the present invention the computer device 902 operates in an autonomous or a semi-autonomous mode and transmits image data based on its own control program.

Thus, in accordance with one aspect of the present invention, a system is provided with a plurality of vehicles and a base communication station in communication with the plurality of vehicles. The vehicles and the base communication station are configured as previously described. A camera on a plurality of vehicles is configured to create images of nearby traffic flow and the processed image signal from each of the one or more of the plurality of vehicles includes images of nearby traffic flow. These images are transmitted to a base communication station which processes the image data from the plurality of vehicles to determine a status of the traffic flow in an area. The base communication station configures an output signal to control a traffic control device in the area based on the status of the traffic flow in the area and the base communication station transmits the output signal to the traffic control device in the area.

The image processing to perform the traffic flow recognition is well known. See, for example, U.S. Pat. No. 6,999,004, U.S. Pat. No. 6,489,920 and U.S. Pat. No. 7,764,808, all of which are incorporated herein by reference.

In accordance with another aspect of the present invention, a system is provided with a plurality of vehicles and a base communication station in communication with the plurality of vehicles. The vehicles and the base communication station are configured as previously described. Carbon monoxide sensors are provided on each of the vehicles. Other sensors, such as NOx sensors or any other environmental condition sensors, including but not limited to humidity, temperature, and ozone sensors may also be provided. The carbon monoxide levels detected by the sensors are transmitted to the base communication station. These levels can be detected with the image data or separately as stand along packages. The base communication system processes the carbon monoxide levels, either as part of a processed image signal or as stand alone signals, from the one or more of the plurality of vehicles to determine the carbon monoxide level in an area. The base communication system sends the output signal based to a traffic controller device based on the carbon monoxide level in the area.

The present invention also has application in mobile identification systems.

In one embodiment of the present invention, the traditionally fixed re-identification systems are extended to a mobile environment. The main motivation is to expand coverage and leverage the pervasiveness of cameras in municipal vehicles. This has been identified by one source as a top-five trend in video surveillance (see: <URLhttp://www.video-surveillance-guide.com/video-surveillance-in-2008.htm>). At least two applications are provided as an aspect of the present invention.

The first application is a vehicle (such as stolen vehicle) identification system. This is done by orienting cameras in vehicles to capture images of surrounding vehicles. The license plate is capture and other a higher-level description of the vehicles can also be captured. In one embodiment of the present invention, the system of FIG. 4 includes a database of suspicious vehicles. The database can either be provided in the base communication station 304 or the base communication station 304 may have access to such a database, for example, through police channels. The base communication station 304 receives images from each of the plurality of vehicles which includes images of nearby vehicles. The base communication station 304 processes the image signal from the one or more of the plurality of vehicles to determine one or more features of the nearby vehicles, typically including a license plate. The base communication station 304 compares the one or more features of the nearby vehicles to the database of suspicious vehicles and the base communication station transmits the output signal based on the comparison of the one or more features of the nearby vehicles to the database of suspicious vehicles.

License plate recognition with an intelligent camera, including a processor, is known. It has, for example, been disclosed in U.S. Pat. No. 6,553,131 to Neubauer et al. issued on Apr. 22, 2003. This patent is hereby incorporated herein by reference.

This database can be a typical database of cars reported stolen or reported to be suspicious, such as those maintained by the police. Such data in a database describes one or more distinguishable properties of a vehicle. A camera on-board a police car records images of adjacent vehicles on the road, extracts features (like license plate, color, etc.) and compares the features against a database, which is periodically updated. A system on-board a police-car or other vehicle such as a bus or a taxi is enabled to match features of the image of the adjacent car with the description in the database and to determine if a match exists. A system for vehicle re-identification based on image data has been disclosed in US Patent Publication Ser. No. 20080294401 to Tsin et al., filed on May 19, 2008, which is incorporated herein by reference. The image taken of an adjacent or close vehicle by a camera on a public vehicle in a further embodiment is analyzed by a license plate recognition system. Such a system is known and has been disclosed for instance in US patent Publication Ser. No. 20090208060 to Wang et al., filed Apr. 23, 2008 which is incorporated herein by reference.

A vehicle recognition or re-identification system or a license plate recognition system in one embodiment of the present invention is installed on a vehicle such as a police car or a bus. It may operate autonomously. This means that a camera constantly provides traffic images to a system that analyzes these images for recognition or re-identification purposes. In a preferred embodiment of the present invention, the image analysis takes place in a system on-board of the camera vehicle. In another embodiment, image data is transmitted to a remote system by the camera car for analysis. In a not autonomous mode, a user may initiate a system to start a recognition process based on a captured image. In a further embodiment, the system includes a navigation and/or GPS system. When a vehicle is recognized by the system it will be marked by the system as recognized and data related to a location, a time, a speed, and a direction of movement may be associated with the recognized vehicle. The system may track the vehicle as long it is within a field of vision of its related cameras. In yet a further embodiment, an image of a vehicle is recorded by a camera on a vehicle and provided with a time stamp and a location stamp and/or a direction of movement when appropriate. The image is analyzed, for instance, for re-identification purposes. In a further embodiment data related to the vehicle is removed from a system after it has been analyzed and no detection took place. In yet a further embodiment the image data will be made anonymous, for instance by blanking out license plate information.

An officer in a police vehicle may be authorized to stop a recognized vehicle. Clearly, passengers or a driver on a bus or a taxi do not have such authority. Also, an officer in a police car may not be able to stop or pursue a recognized car. Thus, in a further embodiment of the present invention, the system, after recognition of a vehicle, alerts a remote system about the recognized car, including its associated data, which includes a time stamp, location data and direction of movement if applicable. The remote system, based on the received data may alert a stationary or mobile recognition system to watch out for this specific vehicle.

The present invention may also be used in suspicious vehicle identification. A license-plate scanning-based system was recently used in California to quickly (a few hours) track a car which struck a 12 year old girl and drove away. The use of mobility in a re-id system could greatly enhance the coverage of the system.

To use the present invention in a suspicious vehicle identification application, the vehicle database in the base communication system (or the database the base communication system has access to) includes parameters related to suspicious vehicles. For example, make and model and color of suspicious cars may be included in the database.

Fixed cameras at an airport, bank, or subway station can identify a suspicious person or vehicle. In one embodiment, identifying information which includes image data or data related to an image is transmitted to a mobile sensing platform with at least one camera. A mobile sensing unit is instructed to analyze recorded image data for a specific object. Thus, all of the mobile re-id units are available to re-identify the suspicious person/vehicle instead of having to rely on only fixed infrastructure. A remote system in one embodiment of the present invention alerts one or more mobile systems that are located on public or other vehicles and provide data to these systems that will make recognition faster. For instance, vehicles within a defined area may receive specific data and a priority status for recognition of the vehicle. Such a priority status allows a system to dedicate all its cameras and computing resources to be dedicated to detection of a to be recognized vehicle, person or object.

The present invention is also applicable in a mobile Eagle-Vision system. Detailed and reliable information about the traffic conditions improves the evaluation and controlling processes. It is therefore preferred to install modern detectors at all important traffic locations. At the same time, the use of measuring systems must be as cost-effective as possible for the operator.

Video detectors that are particularly suited for use at intersections, collecting traffic data, or identifying problems on highways or in tunnels are known. For instance, TrafficEye is an infrared-based detector that can be operated via solar panels and that transmits data via GSM or GPRS. Properties of TrafficEye are described in a brochure entitled "TRAFFIC EYE® Universal Fast detection of traffic conditions, Intelligent Traffic Systems" that is incorporated herein by reference. TrafficEye operates autonomously and provides data related to the number of vehicles, per lane traffic, traffic density, vehicle speed and the like, and thus provides information about a status of traffic, and about changing traffic conditions.

Use Cases and Application for Mobile Cameras in Mobile EagleVision:

A mobile camera part of a computer system located on a vehicle captures the road information and has it stored on an on-board system, which includes a memory or storage device. The vehicle also includes a wireless communication device that is enabled to transmit data from the system to a device outside the vehicle. In one embodiment of the present invention the system is also connected to a navigation and/or GPS system that is installed on the vehicle. This allows captured traffic data to be associated with a specific location. When the vehicle encounters an outside device that can receive data from a mobile system, such as a fixed station, the wireless communication device on the vehicle communicates mobile system data to that fixed station, and the fixed station transmits this to a control system or control room where the data can be processed to adjust or improve traffic flow.

A mobile and autonomous system that captures traffic information at different locations and is capable of providing time and location data has significant advantages:

It extends the coverage for long roads that have few fixed stations

It covers any road topology while fixed cameras are limited to line of sight

It enhances situations with low visibility condition that may be temporary (fog, rain, night) since the vehicle can be close to the areas to monitor, while fixed cameras may lose certain areas to monitor due to inclement weather.

It reduces costs by reducing number of needed fixed stations (fixed stations may be deployed on less frequent basis).

The present invention also has applicability to a public transport prioritization.

In one embodiment of the present invention, a traffic system is provided that can reduce waiting time at traffic lights. To that end, the phase process of the traffic lights is influenced and the requirements of local public transportation are given special consideration. Modern communication systems that work with infrared or wireless transmissions enable to provide data that establish the requirements of buses and trains. Tailor-made traffic-based controls then access current controlling processes timed down to the second to meet the requirement of public transportation vehicles.

Public transportation vehicles such as a bus are provided with sensors and include a camera, a system to process sensor data and a wireless communication device to communicate data processed by the system to a device outside the vehicle. The system in a further embodiment of the present invention may be connected to a navigation and/or GPS system that allows the sensor data to be associated with a vehicle location and a time stamp. The system may also provide a present location of the vehicle. In a further embodiment of the present invention, a bus (or other vehicle) communicates its weight (which may be associated with a number of passengers on board), average speed, current route time table and possibly its current location. Buses with more passengers are exposed to more delays. Hence, based on the current deadline for the next stop of the bus and the expected delay of the trip till the next stop (calculated for instance by using average speed, bus condition, weight or estimated number of passengers), a traffic system controlling a traffic light on the route ahead for the bus reduces its RED phase to allow the bus to catch up with its schedule.

In a system that provide prioritization, one or more vehicles are provided and a base communication system are provided. The vehicles and the base communication are configured as previously described. The cameras in the vehicles generate a processed image signal, as previously described, and the vehicles also determine the number of vehicle passengers, an average vehicle speed and a vehicle time table. This information is included in the processed image signal that is transmitted to the base communication station. Alternatively, this information can be transmitted to the base communication stations separately. The base communication station processes the processed image signal or the separately sent vehicle information signal from the one or more of the plurality of vehicles to configure the output signal based in part on the number of vehicle passengers, the average vehicle speed and the vehicle time table. The base communication station transmits the output signal to the traffic control device to control the traffic control device.

The advantages of such a system in accordance with an aspect of the present invention include:

More green routes. Heavy buses may consume more fuel and pollute more and hence it is recommended not to let it wait for long and/or prevent a stop-and-go driving pattern.

More accurate on-time routes.

The present invention also has applicability in a lane identification system. Lane signals can be used to create additional temporary capacities in one driving direction or to indicate a lane change, such as at construction sites. A lane signal in one embodiment of the present invention is associated with a specific traffic lane. In a further embodiment only vehicles in a specific traffic lane receive messages associated with that specific traffic lane.

A Bus/Vehicle applies a technique using an onboard camera, wireless, or other sensors, that allows it to identify its current lane on the road. A lane signals system as one aspect of the present invention can communicate with a vehicle on a corresponding lane using infrared/wireless communication.

Applications:

Variable Message Signs (VMS) are attached for specific lanes only. Only cars corresponding to a lane can get corresponding beacons/warning.

Help to free the emergency lane for emergencies vehicles (e.g., snow/fire lane).

Allow Dynamic lanes which change its direction based on the traffic volumes.

Ease localized traffic jam by assigning different lanes for vehicles with different speed. The system will ask a vehicle with certain speed to shift to a designated lane to address a temporary jam. At least, JamFree would: 1) reserve lane for high speed cars, and 2) prevents cars with same speed to be on a same row over all lanes.

The Present Invention Also has Applicability in a Hazardous Driver Warning System According to the Volpe National Transportation System Center, one of the enabling technologies for advanced transportation system is "Improved understanding of human performance and behavior." This has highlighted the critical role fatigue plays in many crashes and incidents. It has led to the development of techniques to identify performance degradation and countermeasures which can improve vehicle operator alertness. A better understanding of the ways people interact with automated systems and information displays is leading to system control and operations improvements. Work on human performance also makes possible transportation design changes to reduce the likelihood of operator error, and enhance system safety and efficiency.

To address the problem of hazardous drivers, two main components are provided:

1. Detection System for Hazardous Driver: This can be implemented in two ways:

a. On-Board detection system: vehicle is equipped with sensors (such as a camera, speedometer, brake sensor) that detect the hazardous attitude of the driver. Hazardous driving may include, driving too fast, driving too close to the next car, swerving, weaving, drifting in traffic lane, running a red light, rapid acceleration with rapid braking, driving too slowly compared to traffic flow, and other driving patterns. The on-board system that receives the data from the sensors, can determine if the driving behavior can be characterized as being hazardous. Then, via an on-board communication unit, it can communicate this information with surrounding vehicles and to a Road Side Unit (RSU) of a traffic control system.

b. On-Road systems: Here the sensors are deployed on the road (e.g., Cameras) and with smart driving analysis system, the system can identify any hazardous driving performance.

2. Warning System: Once a normal (non-hazardously driven) vehicle passes along a Road Side Unit (RSU) or on-road sensor (e.g., at traffic light intersection), the RSU should communicate the hazardous vehicle information to the on-board unit (OBU) of the normal vehicle. Then, while the normal vehicle is moving its on-board vision system tracks cars in front and signals immediately a warning if a currently detected vehicle matches the information in the database of the hazardously driven car received from the previous RSUs. In such system the normal vehicle should be equipped with a communication unit (OBU) and any vehicle identification system such as camera that recognize the tags or other identifying information of vehicles in front.

This system in a further embodiment is configured to inform a driver about any neighbor, who is a reckless driver with bad driving records. A simple system assumes that each car is equipped with GPS and GPRS communication unit (iPhone provide such both units). A central unit tracks the location and info about known and possibly convicted hazardous drivers. For instance, a driver with a certain number of traffic infractions, perhaps of a kind that may be designated as dangerous to fellow traffic users, may be listed in a database of hazardous drivers. The central system can provide relevant information about a neighbor driver through for instance general packet radio service (GPRS) or dedicated short-range communications (DSRC) via Road Side Units (RSUs). This allows a driver of a normal vehicle to stay clear of the hazardous driver.

Thus, in accordance with one aspect of the present invention, a system that includes a plurality of vehicles and a base communication station that communicate with each other, as previously described, are provided. The plurality of vehicles capture images from the camera installed on the vehicles and transmit a processed image signal, in the manner previously described to the base communication station. The base communication station processes the image data from each vehicle to determine whether the vehicle is being driven safely and configures the output signal based on whether the vehicle is being driven safely.

The Present Invention Also has Applicability in a Cell-Phone Distraction Avoidance System According to Volpe's journal, the cumulative impact of onboard operator aids raises the possibility of serious information overload for drivers who may already be coping with congested systems, adverse weather, navigation systems, phone conversations, etc. Safety professionals must consider how to minimize the degree of operator distraction associated with the use of advanced safety and convenience features inside a moving vehicle.

In one embodiment of the present invention a situation-aware system is provided that can track the current driving conditions and decides on the level of additional distraction information to pass to the driver. For hazardous driving conditions, no additional information is allowed or provided and all delivery of information is postponed by the system for later delivery. In normal driving conditions, information is delivered normally.

As an example, all cell phone calls will be missed or delivered automatically to voice mail if the system detects hazardous driving conditions (e.g., very crowded area or work zone). The system may also prevent a phone from alerting a user, when the vehicle is in a zone with hazardous driving conditions. Once the conditions have changed (e.g., getting out of a crowded area), the system alerts the driver about the calls and may initiate playback of all the voice mails received during this time. One component of this system is the detection unit that detects the driving conditions. The system may be as simple as a GPS unit that tracks a location and time-of-day and compares it to a local database to decide the current driving condition or if a location is designated as a hazardous driving environment. In a further embodiment the system receives data and/or feedback from camera(s), microphone, and OBD unit to detect the current conditions (e.g., noise level, number of vehicles, driving speed, rate of applying the brakes, etc).

System Description

Figure 11:
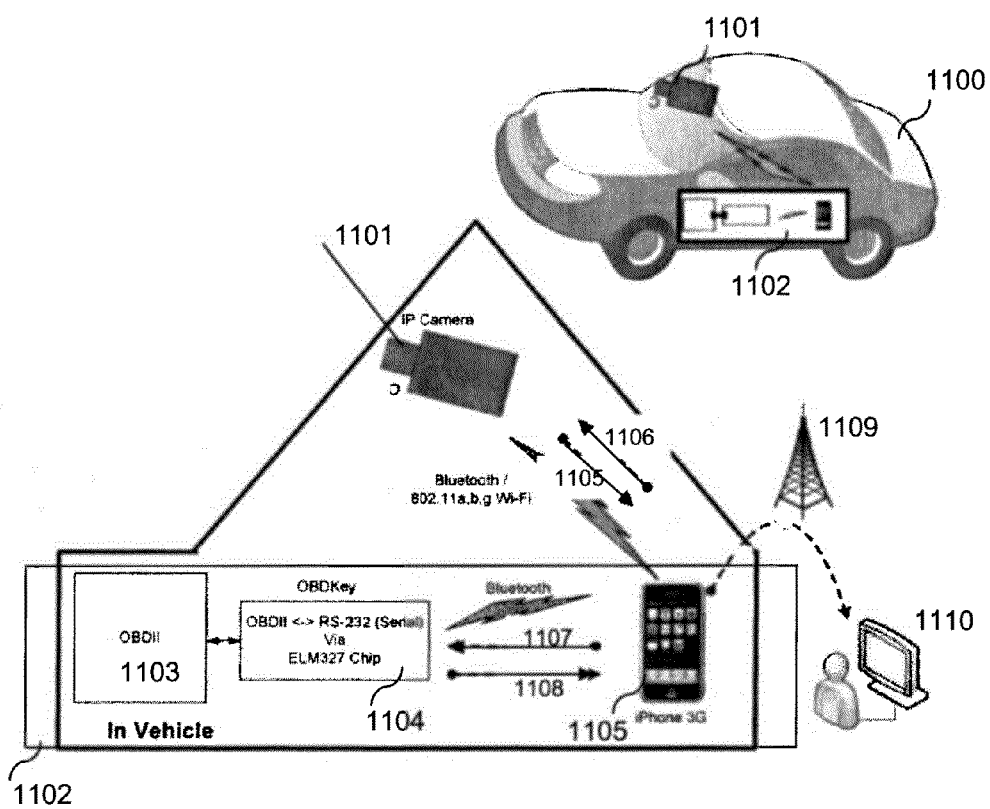

In this section an overview is provided of a general system that can be used to realize the previous embodiments. FIG. 11 illustrates a system architecture for the herein provided solution for automating the monitoring operation of traffic lights: it consists of an in-vehicle subsystem and central server intelligence.

A vehicle 1100 is equipped with:

Vision sensor: a camera 1101 which may be an IP-camera mounted on the vehicle 1100 to capture frames of intersection and traffic lights. The camera can use WiFi or Ethernet or any other appropriate wired or wireless connection interface for instance with directional connections 1105 and 1106 for communication with a system 1102. The system 1102 is further illustrated in FIG. 11.

Interface to other vehicle sensors: For instance a Bluetooth interface to the OBD-II (On-Board Diagnostics) unit 1103 via adapter 1104 and Bluetooth directional connections 1107 and 1108 to collect vehicle mechanical and diagnostic measurements. Other types of wired or wireless connections are also contemplated. Also, interfaces to alternative sensors such as GPS location, speed sensor, etc. and to a road-side systems and system at an intersection are also fully contemplated.

Computational module (e.g on board or mobile, such as an iPhone 1105) to query both IP-camera and OBD-II and process the captured frames and measurements for malfunction detection. In a further embodiment, the computational module 1105 has a processor which is programmed and enabled to perform processing tasks such as image processing for instance for traffic light malfunction detection.

For example, for the traffic light monitoring system, the system operates as follows (once a fleet vehicle is at an intersection or on a periodic basis):

1. Computational module 1105 polls the camera 1101 for frames of the traffic light and intersection;
2. IP Camera 1101 replies with required frame;
3. Computational module 1105 polls OBD 1103 for car's statistics (e.g., speed, stopping time);
4. OBD 1103 replies with required info.
5. Computational module 1105 detects a malfunction traffic light and sends a message for instance an SMS/MMS that contains the GPS location, info, photo of the current intersection and traffic light via a wireless network 1109 to a server 1110;
6. Central Intelligence Server 1110 collects and analyzes data, and may issue maintenance orders.

System Components

The system can integrate the following components:

Location Tracking Module (LTM): this in-vehicle component will be responsible for tracking the location of the vehicle using the GPS information (e.g., GPS device included with iPhone) and track these locations on the locally stored GIS (Geographical Information System) to detect and identify when a vehicle approaches an intersection or traffic light. This would help the vision component (described later) as follows:

In one embodiment the image detection algorithm is tuned knowing the distance between the camera and the traffic light;

In a further embodiment false positives are eliminated since this component avoids detection of artificial traffic lights;

In yet a further embodiment it reduces the false negatives by adjusting and tuning algorithm's parameters;

In yet a further embodiment it reduces continuous frame capturing processing (and corresponding in vehicle communication) when no traffic light or intersection exists, thus saving unnecessary communication and power.

Video Capturing Module (VCM): this in-vehicle component is triggered by the LTM component to start capturing, streaming and storing frames to be analyzed by the next component, the IPM;

Image Processing Module (IPM): this component is responsible for analyzing captured frames to detect traffic lights and recognize a light's current state (red, yellow, green, none);

In-Vehicle Communication Module (IVCM): this component is responsible for communicating with both the camera (via for instance WiFi/Ethernet) to download frames or processed results, and with the OBD-CAN (via for instance Bluetooth) to collect statistics about the vehicle's behavior at the intersection/traffic light;

Out-of Vehicle Communication Module (OVCM): this component is responsible for utilizing a wireless network such as a 3G network to send a message, such as a low-bandwidth short warning message related to problems of traffic lights and high-bandwidth live streams of the intersection for further analysis.

Back-end Central Module (BCM): this central intelligence server component is responsible to collect, store, analyze, visualize, and act based on the information gathered.

Extensions

A system as provided herein in one embodiment of the present invention is extended with an extension to support at least one of several services. Among those extensions:

Integration with On-Board Unit (OBU) and Road-Side Units (RSU), for instance such as provided by Siemens PSE-CT-TCEE in Austria. The RSU in one embodiment is attached to the traffic light and collects measurements of the traffic light performance. The OBU, which is attached via an in-vehicle network, can probe the RSU via a wireless connection and collect information. The OBU can process and summarize the performance of multiple RSUs in a certain region and send a performance summary and information to the control unit.

Embodiments of the present invention as provided herein can be deployed in a variety of systems.

In one system, in-vehicle communication and on-board sensor units are the focus. This phase assumes limited/few deployments on public transportation units. Network coverage for this phase is cellular coverage ALL-time with low-bandwidth. This system is favored where and when no road infrastructure support is assumed.

In another system infrastructure support is the focus. In addition to in-vehicle units, this phase assumes the deployment of infrastructure units on the road acting as supporting points. These units are to be deployed at for instance intersections, traffic lights, work-zone, etc. These infrastructure units collect statistics and communicate with the in-vehicle unit for data collection and analysis. For example, signal timing and phase information at traffic lights can be communicated to and from in-vehicle systems to allow immediate green light change for emergency cars. Network coverage of a vehicle for this phase is cellular coverage ALL-time with low-bandwidth in addition to WiFi coverage or similar SOME-time with high-bandwidth at the infrastructure supporting points.

In another phase, mesh support is provided. In this phase, a mesh network of road side units is assumed to cover the urban areas to have continuous high-bandwidth network coverage. Such coverage allows, for example, monitoring live video streaming within public transportation units such as buses (i.e., public safety) and emergency cars (i.e. medical safety). Network coverage for a vehicle is WiFi coverage or similar ALL time with high-bandwidth and Cellular coverage SOME-time with low bandwidth (if needed), or possibly WiMAX.

Figure 12:
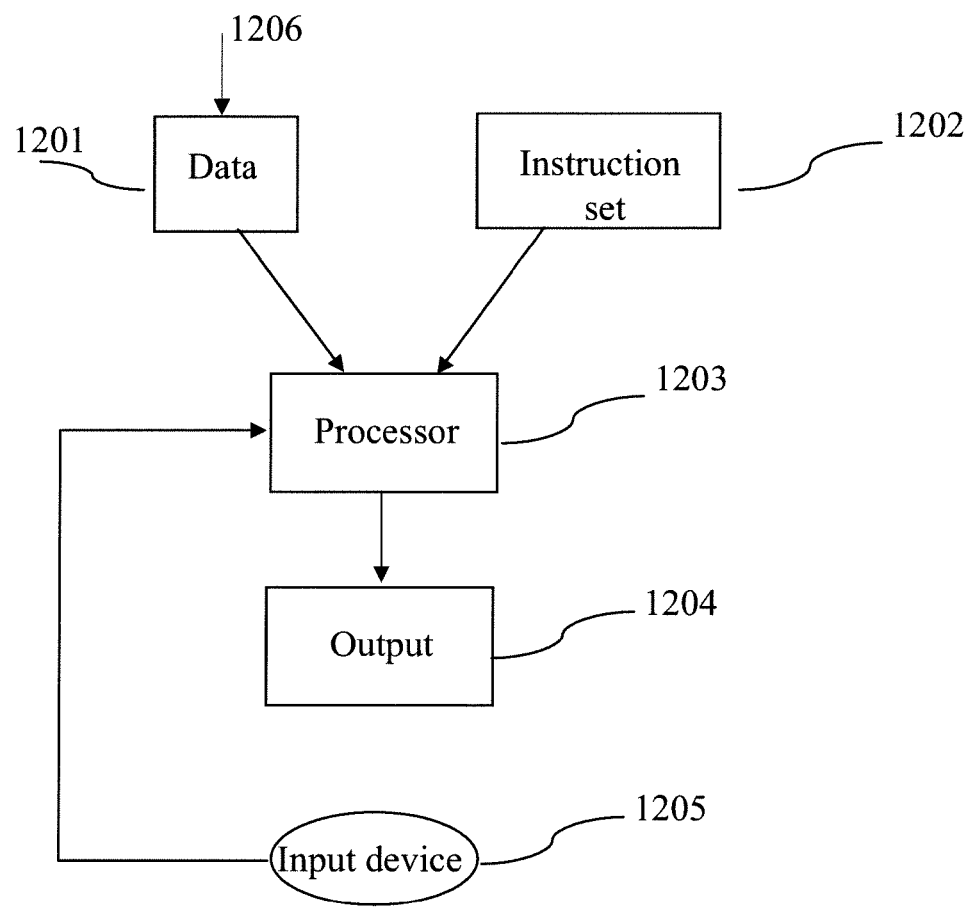
FIG. 12 illustrates a computer system for performing the steps described herein in accordance with one or more aspects of the present invention.

The image recording, image analysis, message creation and other aspects of the present invention can be executed by a system as shown in FIG. 12. The system of FIG. 12 can be implemented in the vehicles to provide necessary processing, including video processing. The system of FIG. 12 can also be implemented in the base communications station. The system is provided with data 1201 which can be image data. Image data may be provided on an input 1206. Data such as image data may be provided by an input device 1205, which in one embodiment is a camera. Such data may be provided on for instance a continuous basis. Other input devices are also contemplated and may include but are not limited to a speed sensor, a navigation system, a GPS system, a communication device, and a computing system having a processor. An instruction set or program 1202 executing the methods of the present invention is stored on a memory and is provided to the processor 1203, which executes the instructions of 1202 to process the data 1201. An image or a message or any other signal resulting from the processor can be outputted on a device 1204. Such a device for instance is a communication device such as a wireless communication device, for instance to provide an alert or for instance provide data to a control system, which may be a remote control system. The processor can be dedicated hardware. However, the processor can also be a CPU or any other computing device that can execute the instructions of 1202. Accordingly the system as shown in FIG. 12 provides a system for mobile sensing and data processing and communication of data related to road safety, traffic management and road maintenance as provided herein and is enabled to execute the steps of the methods as provided herein as an aspect of the present invention.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims appended hereto.

The invention claimed is:

1. A mobile monitoring system, comprising:
 a plurality of vehicles, each vehicle comprising:
  a camera that generates image data;
  a location device that generates geographic coordinates of the vehicle;
  a computing device that receives the image data from the camera and the geographic coordinates of the vehicle and forms a processed image signal that includes the image data, the geographic coordinates and a time stamp and is enabled to perform image recognition; and
  a communication device that receives the processed image signal from the computing device and wirelessly transmits the processed image signal to a base communication station and is enabled to receive a signal from the base communication station; and
 the base communication station in communication with each of the plurality of vehicles to receive processed image signals, the base communication station comprising an image processor to further process the processed image signal from each of the plurality of vehicles to determine a status of traffic flow to form an output signal and a transmitter that transmits the output signal, wherein the output signal is sent to another vehicle to provide instructions to a driver of the other vehicle and the base communication station is enabled to generate an image recognition instruction related to an object; and wherein
  the communication device receives the image recognition instruction for the computing device to execute the image recognition instruction to process an image of the object taken by the camera on the vehicle.

2. The system of claim 1, wherein each of the plurality of vehicles is selected from a group consisting of a bus, a tram, a taxi, a delivery truck, a police car, a service vehicle, an ambulance and combinations thereof.

3. The system of claim 1, wherein the output signal is sent to one of the plurality of vehicles to control the camera, the location device, the computing device or the communication device.

4. The system of claim 1, wherein the camera in at least one of the plurality of vehicles is configured to create images of a traffic control device and the processed image signal includes images of the traffic control device, and wherein the base communication station processes the processed image signal to determine an operation of the traffic control device and if the operation is determined to be defective, the output signal includes information about the operation and location of the traffic control device.

5. The system of claim 4, wherein the traffic control device is a traffic light.

6. The system of claim 4, wherein the traffic control device is a lane changing signal.

7. The system of claim 1, wherein: the camera in one or more of the plurality of vehicles is configured to create images of nearby traffic flow and the processed image signal from each of the one or more of the plurality of vehicles includes images of nearby traffic flow; the base communication station processes the processed image signal from the one or more of the plurality of vehicles to determine an status of the traffic flow in an area; the base communication station configures the output signal to control a traffic control device in the area based on the status of the traffic flow in the area; and the base communication station transmits the output signal to the traffic control device in the area.

8. The system of claim 7, wherein the traffic control device is a traffic light.

9. The system of claim 7, wherein the traffic control device is a lane changing signal.

10. The system of claim 1, wherein: one or more of the plurality of vehicles further comprise a carbon monoxide sensor which provides an output to the computing device and the processed image signal from the one or more of the plurality of vehicles includes a level from the carbon monoxide sensor; the base communication system processes the processed image signal from the one or more of the plurality of vehicles to determine the carbon monoxide level in an area; the base communication system sends the output signal based to a traffic controller device based on the carbon monoxide level in the area.

11. The system of claim 1, further comprising a database of suspicious vehicles wherein the camera in one or more of the plurality of vehicles is configured to create images of nearby vehicles and the processed image signal from each of the one or more of the plurality of vehicles includes images of nearby vehicles; the base communication station processes the processed image signal from the one or more of the plurality of vehicles to determine one or more features of the nearby vehicles; the base communication station compares the one or more features of the nearby vehicles to the database of suspicious vehicles; and the base communication station transmits the output signal based on the comparison of the one or more features of the nearby vehicles to the database of suspicious vehicles.

12. The system of claim 1, further comprising a fixed sensor having a camera that generates an image of a traffic flow in an area and a transmitter that sends the image of the traffic flow to the base communication station, wherein the base communication station processes the processed image signal from the plurality of vehicles and the image of the traffic flow to generate the output signal; and the base communication station transmits the output signal based on the comparison of the one or more features of the nearby vehicles to the database of suspicious vehicles.

13. The system of claim 1, wherein the processed image signal in one or more of the plurality of vehicles includes a number of vehicle passengers, an average vehicle speed and a vehicle time table; the base communication station processes the processed image signal from the one or more of the plurality of vehicles to configure the output signal based in part on the number of vehicle passengers, the average vehicle speed and the vehicle time table; and the base communication station transmits the output signal to the traffic control device to control the traffic control device.

14. The system of claim 1, wherein the base communication station processes the processed image signal from one of the plurality of vehicles to determine whether the vehicle is being driven safely and configures the output signal based on whether the vehicle is being driven safely.

* * * * *